US006568737B1

(12) United States Patent
Li

(10) Patent No.: US 6,568,737 B1
(45) Date of Patent: May 27, 2003

(54) FOLDABLE VEHICLE WINDOW SHADING DEVICE

(76) Inventor: Yu Jin Li, 3612 Arden Dr., #D, El Monte, CA (US) 91731

( * ) Notice: Subject to any disclaimer, the term of this patent is extended or adjusted under 35 U.S.C. 154(b) by 0 days.

(21) Appl. No.: 10/194,477

(22) Filed: Jul. 15, 2002

(51) Int. Cl.$^7$ ................................................ B60J 11/00
(52) U.S. Cl. ................. 296/95.1; 296/136; 160/370.21
(58) Field of Search ............................. 296/95.1, 99.1, 296/136; 160/370.21; 150/166; 135/88.01, 88.05, 88.07, 88.13

(56) References Cited

U.S. PATENT DOCUMENTS

| | | | | | |
|---|---|---|---|---|---|
| 2,842,197 | A | * | 7/1958 | Yeoman | 160/224 |
| 2,948,287 | A | * | 8/1960 | Rupert | 135/126 |
| 3,874,437 | A | * | 4/1975 | Black | 160/370.21 |
| 4,216,989 | A | * | 8/1980 | Tackett | 296/136 |
| 4,805,654 | A | * | 2/1989 | Wang | 135/88.07 |
| 5,240,305 | A | * | 8/1993 | Trethewey | 396/136 |
| 5,388,883 | A | * | 2/1995 | Yang | 296/136 |
| 5,678,878 | A | * | 10/1997 | Clark | 296/95.1 |
| 5,771,912 | A | * | 6/1998 | Swetish | 135/87 |
| 5,795,012 | A | * | 8/1998 | Liou et al. | 296/136 |
| 5,897,156 | A | * | 4/1999 | Hayard et al. | 296/136 |
| 5,927,793 | A | * | 7/1999 | McGrath, Jr. | 296/136 |

FOREIGN PATENT DOCUMENTS

WO     WO 94/26546     * 11/1994     ................ 296/136

* cited by examiner

*Primary Examiner*—D. Glenn Dayoan
*Assistant Examiner*—Gregory Blankenship
(74) *Attorney, Agent, or Firm*—Raymond Y. Ychan; David and Raymond Patent Group

(57) ABSTRACT

A foldable vehicle window shading device includes a central hub having a receiving cavity, and a plurality of folding arms radially extended from the central hub, a plurality of elongated elements extended from the central hub to the folding arms respectively, and an awning shelter supported by the folding arms for sheltering the vehicle window. Each of the folding arms includes a plurality of tubular members wherein a tension portion of the respective elongated element is slidably passed through the tubular members in such a manner that when shortening the length of each tension portion of the elongated elements, the tubular members of each folding arm are tensionally coupled with each other ends to ends to outwardly extend the folding arm from the central hub, so as to tensionally stretch out the awning shelter.

20 Claims, 5 Drawing Sheets

FOLDABLE VEHICLE WINDOW SHADING DEVICE

BACKGROUND OF THE PRESENT INVENTION

1. Field of Invention

The present invention relates to a window shading device, and more particularly to a foldable vehicle window shading device which can be quickly and easily unfolded for sheltering the vehicle window for preventing heat from entering into the interior of the vehicle and folded into a compact unit for carriage and storage.

2. Description of Related Arts

Driving in the summer time is a nuisance since the driver is directly exposed under the sunlight. Therefore, most of the drivers must turn on the air conditioning in order to set an acceptable climate condition inside the interior of the vehicle. However, air conditioning does not work in a cost effective and energy efficient method to cool down the interior temperature of the vehicle. Moreover, once the air conditioning is off, the hot air is trapped inside the vehicle. Especially when the driver at the time gets in the vehicle, the driver can feel the heat flowing in front of his or her face. In other words, when the driver gets in the vehicle, he or she feels like putting himself or herself in the oven.

In order to prevent the heat entering into the vehicle, the driver can tint the vehicle window to block the sunlight directly entering into the vehicle so as to prevent the interior temperature of the vehicle from rising by the heat of the sunlight. However, the tinted window of the vehicle is not allowed in some countries due to the safety purpose.

Alternatively, the driver is able to purchase a reflecting panel mounted on the vehicle window to block the sunlight entering into the interior of the vehicle in such a manner that before the driver leaves the vehicle, the driver can simply place the reflecting panel at an inner side of the vehicle window. It is a hassle for the driver to put on and take off each reflecting panel every time when the driver leaves and gets in the vehicle respectively since a number of reflecting panels must be used to totally shelter all the vehicle windows. Moreover, the size of each reflecting panel is relatively big for the user to carry and store. Even though the reflecting panel can be folded into a compact size, it is annoying for the driver to fold up the reflecting panel into the compact form.

Furthermore, the common drawback of the above mentioned methods is that the tinted window and the reflecting panel can only stop the heat entering from the vehicle window. However, when the vehicle is exposed under the sunlight, the heat can easily enter into the interior of the vehicle through the vehicle body by means of heat radiation.

SUMMARY OF THE PRESENT INVENTION

A main object of the present invention is to provide a foldable vehicle window shading device which is capable of not only sheltering the vehicle window but also covering a top portion of the vehicle body so as to effectively prevent the heat entering into the interior of the vehicle by means of heat radiation.

Another object of the present invention is to provide a foldable vehicle window shading device which can be quickly and easily unfolded for sheltering the vehicle window for preventing heat from entering into the vehicle and folded into a compact unit for carriage and storage.

Another object of the present invention is to provide a foldable vehicle window shading device, wherein an awning shelter is supported by a plurality of folding arms radially extended from a central hub in such a manner that when the folding arms are outwardly unfolded, the awning shelter is stretched out in a tension manner to substantially increase the shading area of the awning shelter.

Another object of the present invention is to provide a foldable vehicle window shading device, wherein the folding and unfolding operation of the foldable vehicle window shading device is easy and fast, that is simply shortening tension portions of the elongated elements which are extended through the folding arms respectively to tensionally stretch out the folding arms.

Another object of the present invention is to provide a foldable vehicle window shading device, wherein no expensive or complicated mechanical structure is required to employ in the present invention in order to achieve the above mentioned objects. Therefore, the present invention successfully provides an economic and effective solution for sheltering the vehicle window to prevent the heat from entering into the interior of the vehicle.

Accordingly, in order to accomplish the above objects, the present invention provides a foldable vehicle window shading device, comprising:

a central hub having a receiving cavity;

a plurality of folding arms radially extended from the central hub, wherein each of the folding arms comprises an outer tubular connector, an inner tubular connector attached to the central hub, and a plurality of tubular members aligning between the outer and inner tubular connectors;

a plurality of elongated elements each having an outer end affixed to the respective outer tubular connector, an inner control portion received in the receiving cavity of the central hub through the inner tubular connecter, and a tension portion which is provided between the outer end and the control portion and slidably passing through the respective tubular members;

an awning shelter supported by the folding arms wherein the awning shelter has an outer light reflecting surface; and a tension control arrangement coupling with each of the control portions of the elongated elements and arranged to move the folding arms between a folded position and an unfolded position, wherein at the folded position, each tension portion of the elongated elements has a predetermined length that the tubular members of each folding arm are loosely coupled with each other so that the folding arms are suspendedly drop down from the central hub, and at the unfolded-position, the tension control arrangement is arranged to shorten the length of each tension portion of the elongated elements so that the tubular members of each folding arm are tensionally coupled with each other ends to ends to outwardly extend the folding arm from the central hub, so as to tensionally stretch out the awning shelter.

DETAILED DESCRIPTION OF THE PREFERRED EMBODIMENT

Figure 1:
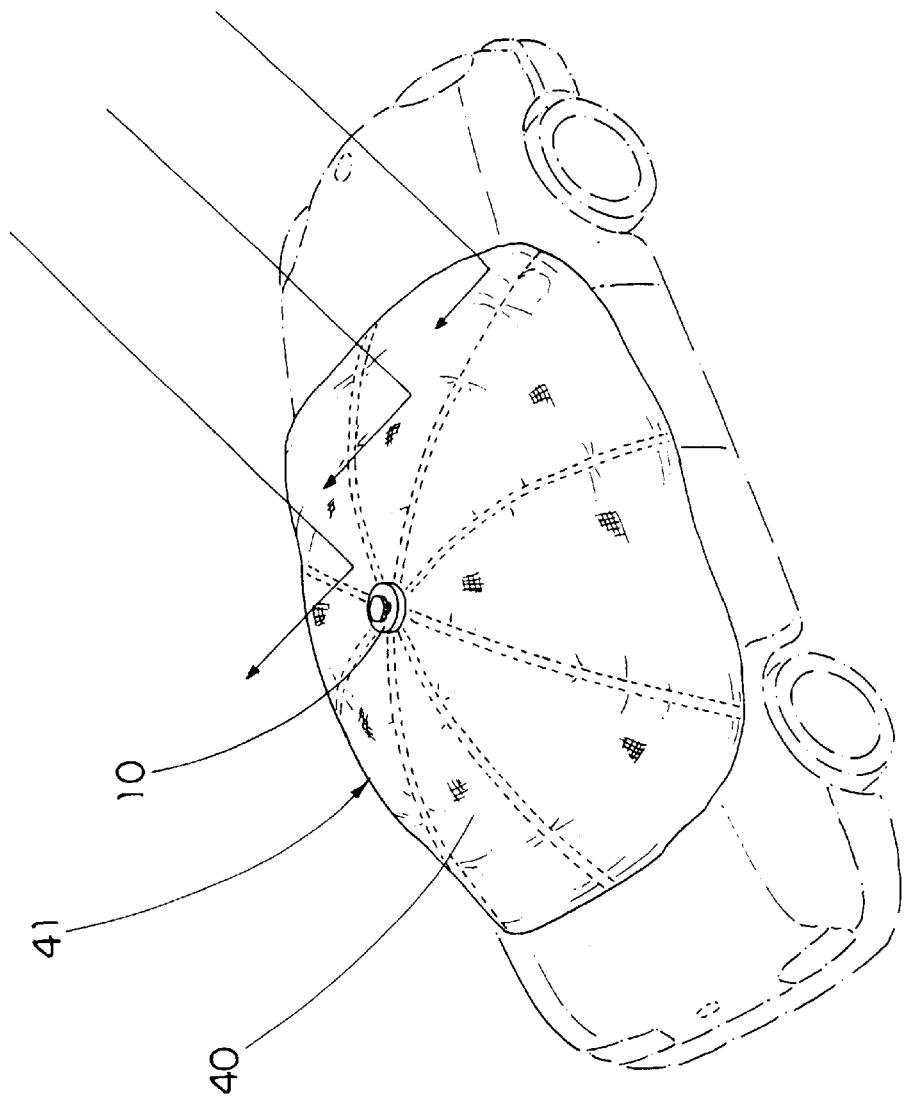
FIG. 1 is a perspective view of a foldable vehicle window shading device sheltering a vehicle according to a preferred embodiment of the present invention.

Referring to FIG. 1 of the drawings, a foldable vehicle window shading device according to a preferred embodiment of the present invention is illustrated, wherein the foldable window shading device is adapted for sheltering on a vehicle body of a vehicle to shade the vehicle window, so as to prevent the heat from entering into the interior of the vehicle.

Figure 2:
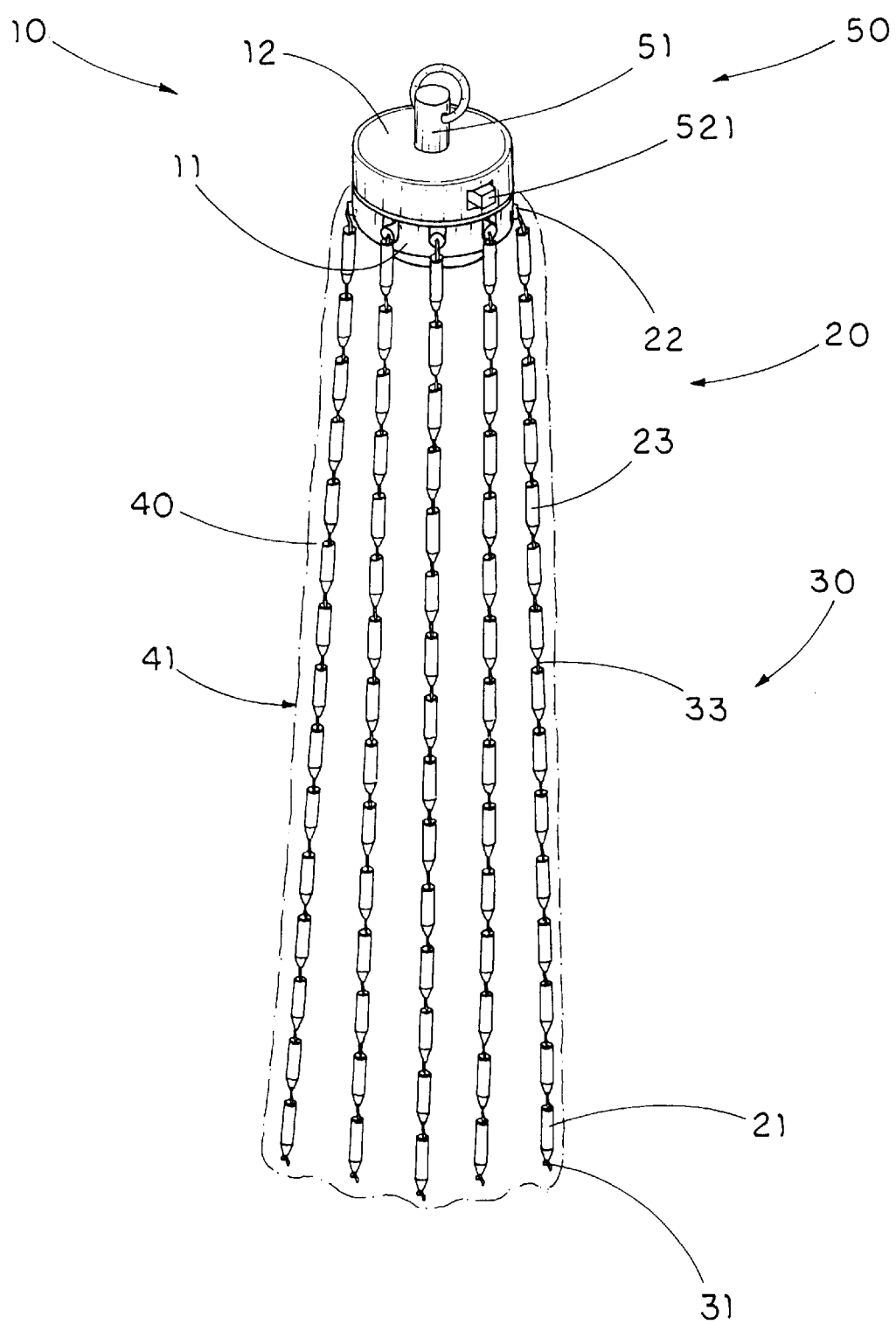
FIG. 2 is a perspective view of the foldable vehicle window shading device in a normal folded position according to the above preferred embodiment of the present invention.
Figure 3:
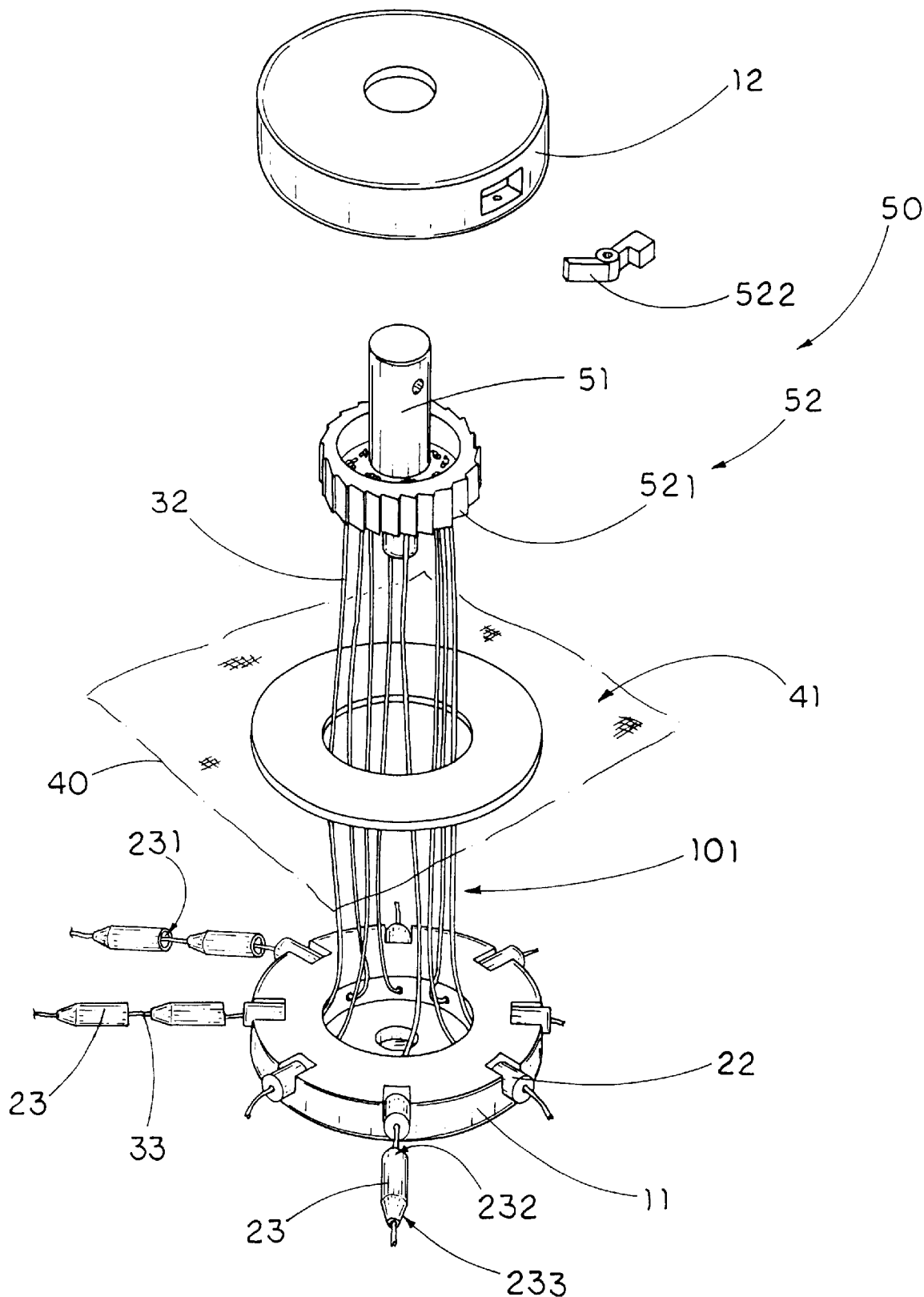
FIG. 3 is an exploded perspective view of the foldable vehicle window shading device according to the above preferred embodiment of the present invention.

As shown in FIGS. 2 and 3, the foldable vehicle window shading device comprises a central hub 10 having a receiving cavity 101, a plurality of folding arms 20 radially extended from the central hub 10, a plurality of elongated elements 30 coupling with the folding arms 20 respectively to the central hub 10, and an awning shelter 40.

The central hub 10 comprises a base casing 11 and an upper casing 12 mounted thereon wherein the receiving cavity 101 is defined between the base casing 11 and the upper casing 12.

Each of the folding arms 20 comprises an outer tubular connector 21, an inner tubular connector 22 attached to the central hub 10, and a plurality of tubular members 23 aligning between the outer and inner tubular connectors 21, 22.

Each of the elongated elements 30 has an outer end 31 affixed to the respective outer tubular connector 21, an inner control portion 32 received in the receiving cavity 101 of the central hub 10 through the inner tubular connector 22, and a tension portion 33 which is provided between the outer end 31 and the control portion 32 and slidably passing through the respective tubular members 23.

The awning shelter 40 is supported by the folding arms 20 wherein the awning shelter 40 has an outer light reflecting surface 41.

The foldable vehicle window shading device further comprises a tension control arrangement 50 coupling with each of the control portions 32 of the elongated elements 30 and arranged to move the folding arms 20 between a folded position and an unfolded position. At the folded position, each tension portion 33 of the elongated elements 30 has a predetermined length that the tubular members 23 of each folding arm 20 are loosely coupled with each other so that the folding arms 20 are suspendedly drop down from the central hub 10, and at the unfolded position, the tension control arrangement 50 is arranged to shorten the length of each tension portion 33 of the elongated elements 30 so that the tubular members 23 of each folding arm 20 are tensionally coupled with each other ends to ends to outwardly extend the folding arm 20 from the central hub 10, so as to tensionally stretch out the awning shelter 40.

According to the preferred embodiment, the foldable arms 20 are preferably made of durable but lightweight material such as plastic such that the foldable vehicle window shading device of the present invention is handy to be carried.

The inner tubular connectors 22 of the folding arms 20 are radially attached to the base casing 11 of the central hub 10 to communicate the receiving cavity 101 of the central hub 10 with outside through the inner tubular connectors 22 in such a manner that the control portion 32 of each elongated element 30 is adapted to slidably pass through the respective inner tubular connector 22 to the receiving cavity 101 of the central hub 10.

Figure 4:
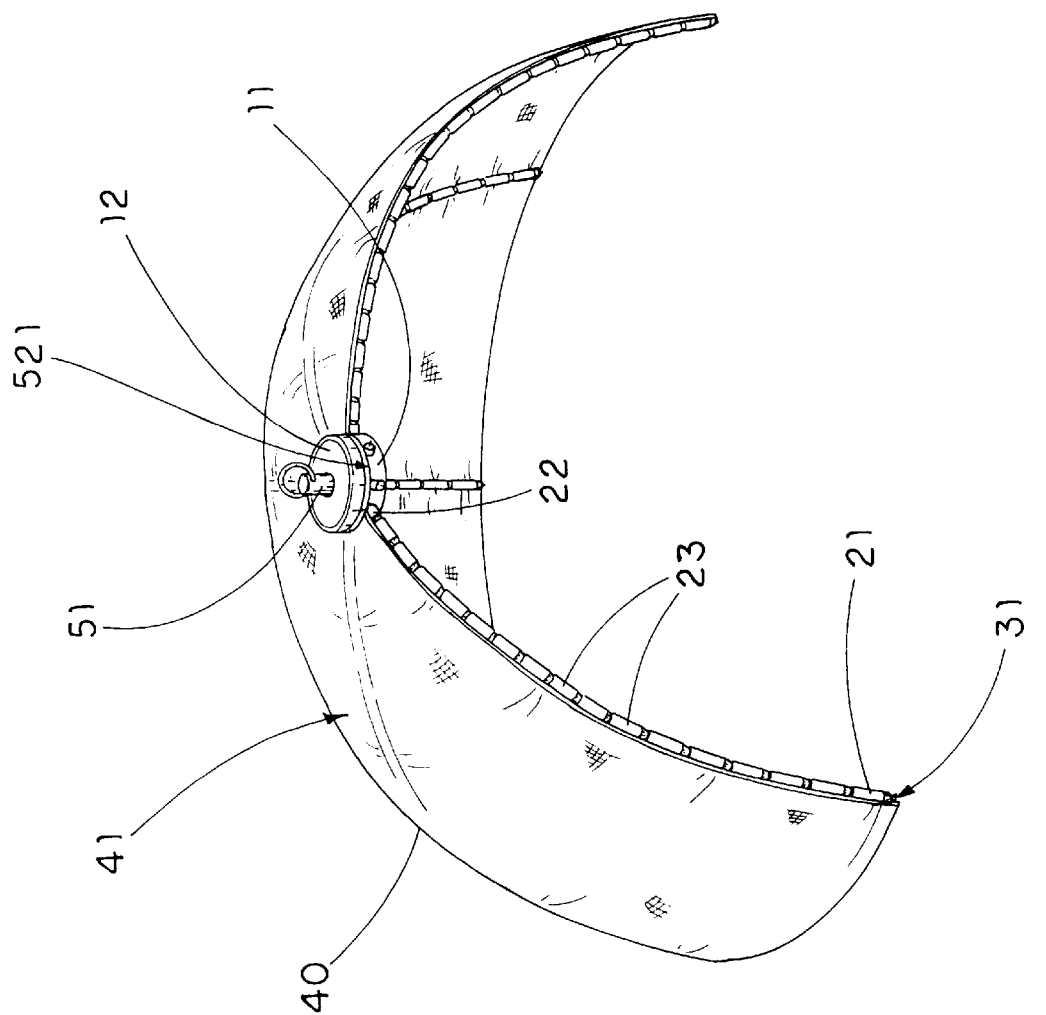
FIG. 4 is a sectional perspective view of the foldable vehicle window shading device in an unfolded position according to the above preferred embodiment of the present invention.

Each of the tubular members 23 has a coaxial through slot 231 adapted for the tension portion 33 of the respective elongated element 30 slidably passing through such that each tubular member 23 is adapted to slide along the tension portion 33 of the elongated element 30. Each of the tubular members 23 has an upper end 232 and a bottom tapered end 233 wherein the tapered end of each tubular member 23 is arranged to insert into the upper end 232 of the adjacent tubular member 23 in such a manner that the tubular members 23 are coupled with each other ends to ends to form the respective folding arm 20 having a curved shaped. In other words, the folding arms 20 are stretched out like an outdoors umbrella frame at the unfolded position, as shown in FIG. 4.

As shown in FIG. 3, each of the outer tubular connectors 21 has the same structure of the tubular member 23 wherein the outer end 31 of the elongated element 30 is securely affixed to the respective outer tubular connector 21 by forming a knot at the outer end 31 of the elongated element 30 while the outer end 31 of the elongated element 30 is slidably passed through the outer tubular connectors 21.

In other words, the tension portion 33 of the elongated element 30 is slidably passed through the respective folding arm 20, i.e. the inner tubular connector 22, the tubular member 23, and the outer tubular connector 21, while the outer end 31 of the elongated element 30 is formed the knot to block the tubular member 23 and the outer tubular connector 21 sliding out of the tension portion 33 of the elongated element 30. It is worth mentioning that the outer end 31 of the elongated element 30 can be directly fastened to the respective outer tubular connectors 21 by means rivet so as to prevent the tubular members 23 sliding out of the tension portion 33 of the elongated element 30.

Accordingly, each of the elongated elements 30, which is a durable string in the present preferred embodiment, has a predetermined length adapted to extend from the central hub 10 to the respective outer tubular connectors 21. Therefore, while lengthening the length of the control portion 32 of the elongated element 30, the length of the tension portion 33 of the elongated element 30 will be substantially shortened.

As shown in FIG. 3, the base casing 11 of the central hub 10 has a ring shape such that the inner tubular connectors 22 of the folding arms 20 are radially attached to an outer circumferential surface of the base casing 11 wherein the control portions 32 of the elongated elements 30 are slidably passed through the inner tubular connectors 22 to the receiving cavity 101 through an inner circumferential surface of the base casing 11.

The awning shelter 40 is coaxially mounted to the central hub 10 and supported by the folding arms 20 in such a manner that the awning shelter 40 is adapted to be folded up in a bunch manner, as shown in FIG. 2 and unfolded to stretch out to form an awning shape for providing a shading area, as shown in FIG. 4. Accordingly, the awning shelter 40 is made of durable but lightweight material wherein the awning shelter 40 is shaped and sized adapted for sheltering the top portion of the vehicle including the vehicle windows, as shown in FIG. 1.

Moreover, the light reflecting surface 41 of the awning shelter 40 is arranged to face toward the sunlight in such a manner that when the awning shelter 40 is placed on the vehicle body, the light reflecting surface 41 of the awning shelter 40 is capable of reflecting the sunlight for blocking the sunlight entering into the interior of the vehicle so as to prevent the heat ingoing the vehicle by radiation. Preferably, the awning shelter 40 should provide a waterproof ability to prevent water or rain passing therethrough.

As shown in FIG. 3, the tension control arrangement 50 comprises an operation shaft 51 which is rotatably supported in the receiving cavity 101 of the central hub 10 and is fastened to the control portions 32 of the elongated elements 30, wherein a portion of the operation shaft 51 is extended out of the central hub 10 through a hole provided on the upper casing 12. Therefore, by rotating the operation shaft 51 to wind up the control portions 32 of the elongated elements 30 on the operation shaft 51, the lengths of the tension portions 33 of the elongated elements 30 are shortened so that the tubular members 23 of each folding arm 20 are tensionally coupled with each other ends to ends to outwardly extend the folding arm 20 from the central hub 10, so as to tensionally stretch out the awning shelter 40, i.e. the unfolded position of the foldable vehicle window shading device. In other words, when the operation shaft 51 is rotated in an opposite direction to unwind the control portions 32 of the elongated elements 30 on the operation shaft 51, the lengths of the tension portions 33 of the elongated elements 30 are lengthened so that the tubular members 33 of the folding arms 30 are loosely coupled with each other that the folding arms 20 are suspendedly drop down from the central hub 10, i.e. the folded position of the foldable vehicle window shading device of the present invention.

The tension control arrangement 50 further comprises a locking unit 52 for locking up a rotational movement of the operation shaft 51 wherein the locking unit 52 comprises a locking gear 521 coaxially mounted to the operation shaft 51 and a blocking locker 522 supported in the receiving cavity 101 and arranged to engage with the locking gear 521 so as to lock up the operation shaft 51 in a rotatably movable manner.

It is worth mentioning that when the operation shaft 51 is rotated to wind up the control portions 33 of the elongated elements 30, the folding arms 20 are tensionally stretched out. At the same time, the blocking locker 522 is engaged with the locking gear 521 to lock up the rotational movement of the operation shaft 51 so as to retain the folding arms 20 in the unfolded position. While releasing the engagement between the blocking locker 522 and the locking gear 521, the tension of each folding arm 20 is reduced. Due to the weight of each folding arm 20, the folding arms 20 will automatically drop down and back to the folded position.

Figure 5:
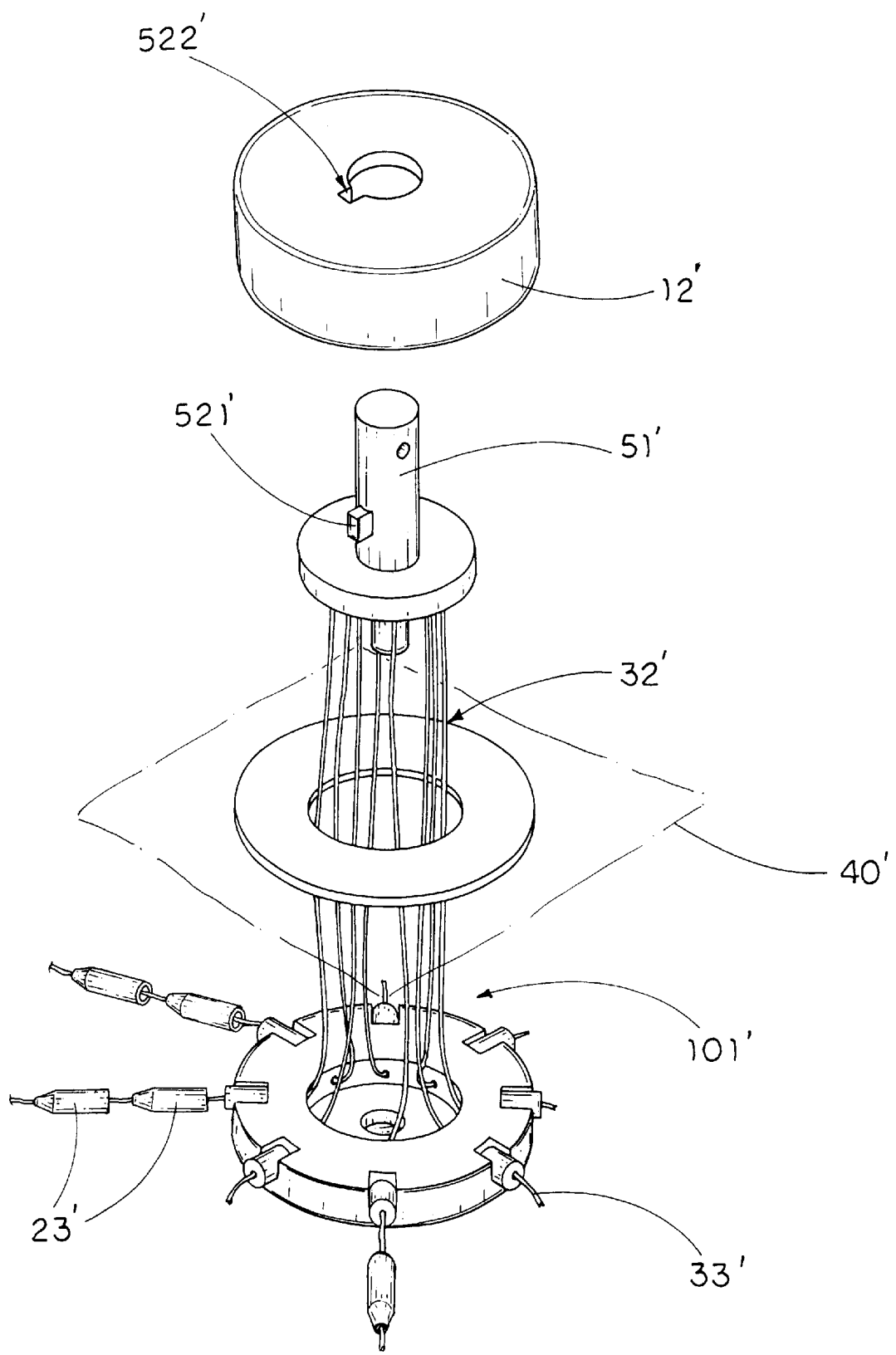
FIG. 5 illustrates an alternative mode of a tension control arrangement of the foldable vehicle window shading device according to the above preferred embodiment of the present invention.

FIG. 5 illustrates an alternative mode of the tension control arrangement 50' which comprises an operation shaft 51' slidably supported in the receiving cavity 101' in a vertically movable manner and fastened to the control portions 32' of the elongated elements 30' wherein a top portion of the operation shaft 51' is upwardly extended from the receiving cavity 101' to outside through a central hole of the upper casing 12' of the central hub 10' in such a manner that when the operation shaft 51' is moved upwardly to pull the control portions 32' of the elongated elements 30' into the receiving cavity 101', the lengths of the tension portions 33' of the elongated elements 30' are substantially shortened so that the tubular members 23' of each folding arm 20' are tensionally coupled with each other ends to ends to outwardly extend the folding arm 20' from the central hub 10', so as to tensionally stretch out the awning shelter 40'.

The tension control arrangement 50' further comprises a locking unit 52' for locking up a vertical movement of the operation shaft 51' so as to retain the folding arms 20' in the unfolded position. The locking unit 52' comprises at least a locking latch 521' radially extended from the operation shaft 51' and has at least a radial slot 522' integrally extended from the central hole of the upper casing 12' of the central hub 10' in such a manner that after the control portions 33' of the elongated elements 30' are wound up around the operation shaft 51', the operation shaft 51' is arranged to move upwardly while the locking latch 521' is aligned to slidably pass the radial slot 522', so that by rotating the operation shaft 51' to misalign the locking latch 521' with the radial slot 522', the locking latch 521' is rested on the ceiling of the upper casing 12' of the central hub 10' for blocking the operation shaft 51' from sliding downward, so as to retain the folding arms 20' in the unfolded position.

It is worth mentioning that the foldable vehicle window shading device of the present invention can substantially provide the shading area for sheltering the top portion of the vehicle so as to prevent the top portion of the vehicle directly exposing under the sunlight. Since all the vehicle windows of the vehicle are sheltered by the awning shelter, the present invention is capable of minimizing the heat from entering into the interior of the vehicle. Moreover, when the foldable vehicle window shading device is folded into the compact unit, it can be simply stored in a trunk of the vehicle.

Furthermore, the use of the foldable vehicle window shading device can be applied in our daily life. When the foldable vehicle window shading device is suspendedly supported by a supporting shaft or a tree, the present invention functions as an outdoor umbrella. Therefore, the user is able to use the present invention during outdoor activities especially on the beach or camping. Moreover, since the folding operation of the foldable vehicle window shading device is quick and easy, the structural design of the present invention can be applied on the tent, such that the user, such as camper, scout, or soldier, can set up and fold up the tent in seconds. While the foregoing description and diagram describe the preferred embodiment and its alternative mode of the present invention, it should be appreciated that certain obvious modifications, variations, and substitutions may be made without departing from the spirit and scope of the present invention.

What is claimed is:

1. A foldable vehicle window shading device, comprising:
   a central hub having a receiving cavity;
   a plurality of folding arms radially extended from said central hub, wherein each of said folding arms comprises an outer tubular connector, an inner tubular connector attached to said central hub, and a plurality of tubular members aligning between said outer and inner tubular connectors;
   a plurality of elongated elements each having an outer end affixed to said respective outer tubular connector, an inner control portion received in said receiving cavity of said central hub through said inner tubular connector, and a tension portion which is provided between said outer end and said control portion and slidably passing through said respective tubular members;
   an awning shelter supported by said folding arms wherein said awning shelter has an outer light reflecting surface; and a tension control arrangement coupling with each of said control portions of said elongated elements and arranged to move said folding arms between a folded position and an unfolded position, wherein at said folded position, each tension portion of said elongated elements has a predetermined length that said tubular members of each folding arm are loosely coupled with each other so that said folding arms are suspendedly drop down from said central hub, and at said unfolded position, said tension control arrangement is arranged to shorten said length of each said tension portion of said elongated elements so that said tubular members of each said folding arm are tensionally coupled with each other ends to ends to outwardly extend said folding arm from said central hub, so as to tensionally stretch out said awning shelter to provide a shading area below said awning shelter for sheltering a top portion of a vehicle.

2. A foldable vehicle window shading device, as recited in claim 1, wherein said outer end of each said elongated element is securely affixed to said respective outer tubular connector by slidably passing said outer end of said elongated element through said outer tubular connector and forming a knot at said outer end of said elongated element.

3. A foldable vehicle shading device, as recited in claim 1, wherein each of said tubular members has a coaxial through slot adapted for said tension portion of said respective elongated element slidably passing through in such a manner that said tubular members of each said folding arm are slidably supported by said tension portion of said respective elongated element between said inner and outer tubular connectors.

4. A foldable vehicle shading device, as recited in claim 1, wherein each of said tubular members has an upper end and a bottom tapered end, wherein said tapered end of each said tubular member is arranged to insert into said upper end of said adjacent tubular member in such a manner that said tubular members are coupled with each other ends to ends to form said respective folding arm having a curved shaped at said unfolded position.

5. A foldable vehicle shading device, as recited in claim 1, wherein said central hub comprises a base casing, having a ring shape, and an upper casing mounted thereon to form said receiving cavity between said base casing and said upper casing, wherein said inner tubular connectors of said folding arms are radially attached to an outer circumferential surface of said base casing in such a manner that said control portion of each said elongated element is slidably passed through said respective inner tubular connector to said receiving cavity through an inner circumferential surface of said base casing.

6. A foldable vehicle shading device, as recited in claim 2, wherein said central hub comprises a base casing, having a ring shape, and an upper casing mounted thereon to form said receiving cavity between said base casing and said upper casing, wherein said inner tubular connectors of said folding arms are radially attached to an outer circumferential surface of said base casing in such a manner that said control portion of each said elongated element is slidably passed through said respective inner tubular connector to said receiving cavity through an inner circumferential surface of said base casing.

7. A foldable vehicle shading device, as recited in claim 3, wherein said central hub comprises a base casing, having a ring shape, and an upper casing mounted thereon to form said receiving cavity between said base casing and said upper casing, wherein said inner tubular connectors of said folding arms are radially attached to an outer circumferential surface of said base casing in such a manner that said control portion of each said elongated element is slidably passed through said respective inner tubular connector to said receiving cavity through an inner circumferential surface of said base casing.

8. A foldable vehicle shading device, as recited in claim 4, wherein said central hub comprises a base casing, having a ring shape, and an upper casing mounted thereon to form said receiving cavity between said base casing and said upper casing, wherein said inner tubular connectors of said folding arms are radially attached to an outer circumferential surface of said base casing in such a manner that said control portion of each said elongated element is slidably passed through said respective inner tubular connector to said receiving cavity through an inner circumferential surface of said base casing.

9. A foldable vehicle shading device, as recited in claim 1, wherein said tension control arrangement comprises an operation shaft which is rotatably supported in said receiving cavity of said central hub and fastened to said control portions of said elongated element in such a manner that by rotating said operation shaft to wind up said control portions of said elongated elements on said operation shaft, said lengths of said tension portions of said elongated elements are substantially shortened to unfold said folding arms respectively.

10. A foldable vehicle shading device, as recited in claim 4, wherein said tension control arrangement comprises an operation shaft which is rotatably supported in said receiving cavity of said central hub and fastened to said control portions of said elongated element in such a manner that by rotating said operation shaft to wind up said control portions of said elongated elements on said operation shaft, said lengths of said tension portions of said elongated elements are substantially shortened to unfold said folding arms respectively.

11. A foldable vehicle shading device, as recited in claim 8, wherein said tension control arrangement comprises an operation shaft which is rotatably supported in said receiving cavity of said central hub and fastened to said control portions of said elongated element in such a manner that by rotating said operation shaft to wind up said control portions of said elongated elements on said operation shaft, said lengths of said tension portions of said elongated elements are substantially shortened to unfold said folding arms respectively.

12. A foldable vehicle window device, as recited in claim 9, wherein said tension control arrangement further comprises a locking unit for locking up a rotational movement of said operation shaft, wherein said locking unit comprises a locking gear coaxially mounted to said operation shaft and a blocking locker supported in said receiving cavity and arranged to engage with said locking gear so as to lock up said operation shaft in a rotatably movable manner.

13. A foldable vehicle window device, as recited in claim 10, wherein said tension control arrangement further comprises a locking unit for locking up a rotational movement of said operation shaft, wherein said locking unit comprises a locking gear coaxially mounted to said operation shaft and a blocking locker supported in said receiving cavity and arranged to engage with said locking gear so as to lock up said operation shaft in a rotatably movable manner.

14. A foldable vehicle window device, as recited in claim 11, wherein said tension control arrangement further comprises a locking unit for locking up a rotational movement of said operation shaft, wherein said locking unit comprises a locking gear coaxially mounted to said operation shaft and a blocking locker supported in said receiving cavity and arranged to engage with said locking gear so as to lock up said operation shaft in a rotatably movable manner.

15. A foldable vehicle window device, as recited in claim 1, wherein said tension control arrangement comprises an operation shaft slidably supported in said receiving cavity in a vertically movable manner and fastened to said control portions of said elongated elements in such a manner that when said operation shaft is moved upwardly to pull said control portions of said elongated elements into said receiving cavity, said lengths of said tension portions of said elongated elements are substantially shortened to unfold said folding arms respectively.

16. A foldable vehicle window device, as recited in claim 4, wherein said tension control arrangement comprises an operation shaft slidably supported in said receiving cavity in a vertically movable manner and fastened to said control portions of said elongated elements in such a manner that when said operation shaft is moved upwardly to pull said control portions of said elongated elements into said receiving cavity, said lengths of said tension portions of said elongated elements are substantially shortened to unfold said folding arms respectively.

17. A foldable vehicle window device, as recited in claim 8, wherein said tension control arrangement comprises an operation shaft slidably supported in said receiving cavity in a vertically movable manner and fastened to said control portions of said elongated elements in such a manner that when said operation shaft is moved upwardly to pull said control portions of said elongated elements into said receiving cavity, said lengths of said tension portions of said elongated elements are substantially shortened to unfold said folding arms respectively.

18. A foldable vehicle window device, as recited in claim 15, wherein said tension control arrangement further comprises a locking unit for locking up a vertical movement of said operation shaft, wherein said locking unit comprises at least a locking latch radially extended from said operation shaft and has at least a radial slot formed on a ceiling of said central hub in such a manner that when said operation shaft is moved upwardly, said locking latch is aligned to slidably pass said radial slot, so that by rotating said operation shaft to misalign said locking latch with said radial slot, said locking latch is rested on said ceiling of said central hub for blocking said operation shaft from sliding downward, so as to retain said folding arms in said unfolded position.

19. A foldable vehicle window device, as recited in claim 16, wherein said tension control arrangement further comprises a locking unit for locking up a vertical movement of said operation shaft, wherein said locking unit comprises at least a locking latch radially extended from said operation shaft and has at least a radial slot formed on a ceiling of said central hub in such a manner that when said operation shaft is moved upwardly, said locking latch is aligned to slidably pass said radial slot, so that by rotating said operation shaft to misalign said locking latch with said radial slot, said locking latch is rested on said ceiling of said central hub for blocking said operation shaft from sliding downward, so as to retain said folding arms in said unfolded position.

20. A foldable vehicle window device, as recited in claim 17, wherein said tension control arrangement further comprises a locking unit for locking up a vertical movement of said operation shaft, wherein said locking unit comprises at least a locking latch radially extended from said operation shaft and has at least a radial slot formed on a ceiling of said central hub in such a manner that when said operation shaft is moved upwardly, said locking latch is aligned to slidably pass said radial slot, so that by rotating said operation shaft to misalign said locking latch with said radial slot, said locking latch is rested on said ceiling of said central hub for blocking said operation shaft from sliding downward, so as to retain said folding arms in said unfolded position.

* * * * *